United States Patent
Schober et al.

(10) Patent No.: US 12,526,779 B2
(45) Date of Patent: Jan. 13, 2026

(54) BEAM SPECIFIC SLOT COMBINATION

(71) Applicant: NOKIA TECHNOLOGIES OY, Espoo (FI)

(72) Inventors: Karol Schober, Helsinki (FI); Vitaly Petrov, Espoo (FI); Esa Tapani Tiirola, Oulu (FI); Kari Juhani Hooli, Oulu (FI); Timo Erkki Lunttila, Espoo (FI)

(73) Assignee: Nokia Technologies Oy, Espoo (FI)

( * ) Notice: Subject to any disclaimer, the term of this patent is extended or adjusted under 35 U.S.C. 154(b) by 324 days.

(21) Appl. No.: 18/247,328

(22) PCT Filed: Oct. 15, 2020

(86) PCT No.: PCT/EP2020/079047
§ 371 (c)(1),
(2) Date: Mar. 30, 2023

(87) PCT Pub. No.: WO2022/078605
PCT Pub. Date: Apr. 21, 2022

(65) Prior Publication Data
US 2024/0008007 A1    Jan. 4, 2024

(51) Int. Cl.
*H04W 72/0446* (2023.01)
*H04L 5/00* (2006.01)
*H04W 72/044* (2023.01)
*H04W 74/0808* (2024.01)

(52) U.S. Cl.
CPC ..... *H04W 72/0446* (2013.01); *H04W 72/046* (2013.01); *H04W 74/0808* (2013.01)

(58) Field of Classification Search
CPC ........... H04W 72/0446; H04W 72/046; H04W 74/0808
USPC ....................................................... 370/336
See application file for complete search history.

(56) References Cited

U.S. PATENT DOCUMENTS

| | | |
|---|---|---|
| 2020/0195334 A1 | 6/2020 | Zhou et al. |
| 2021/0007128 A1* | 1/2021 | Bhattad ................. H04W 16/14 |
| 2021/0029637 A1* | 1/2021 | Jiang ...................... H04L 5/0005 |
| 2021/0344558 A1* | 11/2021 | Lee ..................... H04L 41/0803 |

FOREIGN PATENT DOCUMENTS

WO    WO-2019160741 A1 *    8/2019    ........... H04L 5/0048

OTHER PUBLICATIONS

3GPP TS 38.213 V15.6.0 (Jun. 2019) (Year: 2019).*
International Search Report and Written Opinion for International Application No. PCT/EP2020/079047, mailed on Jun. 28, 2021, 14 pages.

* cited by examiner

*Primary Examiner* — Intekhaab A Siddiquee
(74) *Attorney, Agent, or Firm* — Lippes Mathias LLP (57) ABSTRACT

There is provided a method for UE of a wireless communication network, the method comprising: receiving, from a network element of the wireless communication network, a first SFI element of a first type indicating a beam specific slot combination for the UE, the slot combination comprising at least one temporary slot comprising at least one temporary symbol configured to be overwritable by a SFI element of a second type or another SFI element of the first type; and following a configured behavior during the at least one temporary symbol.

20 Claims, 5 Drawing Sheets

BEAM SPECIFIC SLOT COMBINATION

CROSS-REFERENCE TO RELATED APPLICATIONS

This application is a national stage entry of International Application No. PCT/EP2020/079047, filed Oct. 15, 2020, entitled "BEAM SPECIFIC SLOT COMBINATION" which is hereby incorporated by reference in its entirety.

TECHNICAL FIELD

The following exemplary embodiments relate to communications.

BACKGROUND

Modern wireless networks may utilize various techniques, such as unlicensed operation and multibeam operation, to enhance network performance. It may be beneficial to provide solutions that target to improve flexibility of the network utilizing such techniques. For example, solutions targeting to increase flexibility of resource allocation may prove prominent.

BRIEF DESCRIPTION

According to an aspect, there is provided the subject matter of the independent claims. Some embodiments are defined in the dependent claims.

The embodiments that do not fall under the scope of the claims are to be interpreted as examples useful for understanding the disclosure.

One or more examples of implementations are set forth in more detail in the accompanying drawings and the description below. Other features will be apparent from the description and drawings, and from the claims.

BRIEF DESCRIPTION OF DRAWINGS

In the following some embodiments will be described with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
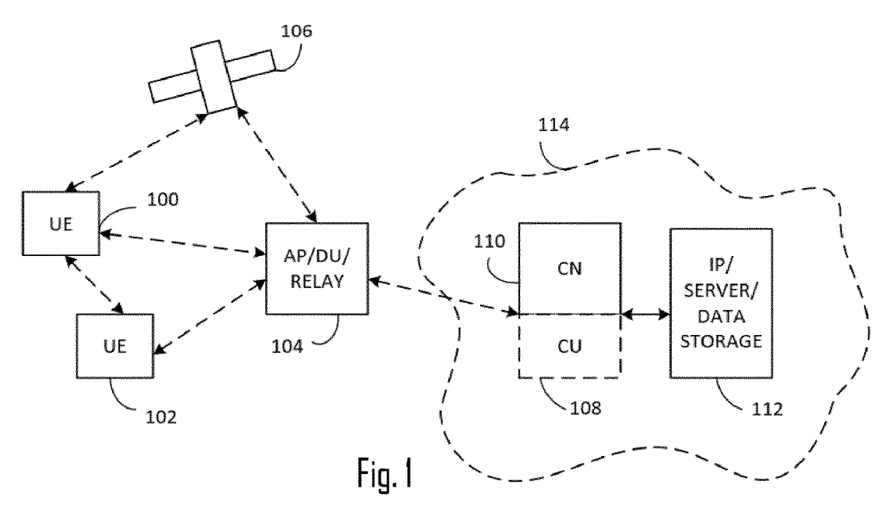
FIG. 1 illustrates an example of a wireless communication system to which embodiments may be applied.

FIG. 1 depicts examples of simplified system architectures showing some elements and functional entities whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network. FIG. 1 shows terminal devices or user devices 100 and 102 configured to be in a wireless connection on one or more communication channels in a cell with an access node (such as (e/g)NodeB) 104 providing the cell. (e/g)NodeB refers to an eNodeB or a gNodeB, as defined in 3GPP specifications. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes but also for routing data from one (e/g)NodeB to another. The (e/g)NodeB is a computing device configured to control the radio resources of communication system it is coupled to. The NodeB may also be referred to as a base station, an access point, an access node, or any other type of interfacing device including a relay station capable of operating in a wireless environment. An example of relay station is integrated access and backhaul (IAB) node where the base station functionalities are carried out by the DU (Distributed Unit) part of the IAB node. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobility management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of relay station deployment is IAB node where the user device functionalities are carried out by the MT (Mobile Termination) part of the IAB node. MT part may be responsible for providing the backhaul connection(s) with a parent node, such as parent IAB node (DU), or a donor node (DU) having a wired connection to the CU (Centralized Unit).

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink device, of which an example is a camera or video camera loading images or video clips to a network. A user device may also be a device having capability to operate in Internet of Things (IoT) network, such as Industrial IoT (IIoT) network, which is a scenario in which objects are provided with the ability to transfer data over a network without needing human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses. User device herein may also refer to vehicular implementations, such as vehicle UEs. Such UEs may be comprised and/or communicatively coupled with vehicle such that they may be understood as part of the vehicle or vehicles.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not necessarily shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control). 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and typically fully centralized in the core network. The low-latency applications and services in 5G may need to bring the content close to the radio which leads to local break out and multi-access edge computing (MEC). 5G enables analytics and knowledge generation to occur at the source of the data. This approach may need leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano)satellites are deployed). Satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs may be needed to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network, may aggregate traffic from a large number of HNBs back to a core network. The network discussed herein may refer to, for example, cellular network such as 5G and the like.

As indicated with an arrow in FIG. 1, the UEs 100, 102 (and/or any other UE of the described system) may support device-to-device (D2D) communication. D2D communication may sometimes be referred to as sidelink communication.

The introduced system may support unlicensed operation, such as radio bands between 52.6 and 71 gigahertz (GHz). There may be a lot of unlicensed bands available in the range of 57-71 GHz, making the unlicensed operation at mmWaves an interesting option for NR future development. Unlicensed operation in 52.6 GHz to 71 GHz may open room for the large available bandwidth. This in turn can support a broad range of services including but not limited to Enhanced Mobile Broadband (eMBB), high rate D2D, Augmented Reality (AR)/Virtual Reality (VR), and the like. At the same time, operation in these unlicensed bands may require following certain regulatory rules to support a fair coexistence between different Radio Access Technologies (RATs). Even if regulations would not explicitly require listen-before-talk (LBT) procedure, it is beneficial to implement LBT in mobile access networks to increase probability that regulatory rules may be followed now and in the future. So, as soon as the gNB determines, after performing channel assessment, that to be used radio channel is free (or fulfils one or more conditions that are required to be met in order to deem LBT successful), the gNB may occupy the channel for duration of Channel Occupation Time (COT) (sometimes referred to as channel occupancy time). For example, COT may be up to five (5) milliseconds (ms) in 57-71 GHz spectrum. If the LBT succeeds, the gNB may inform the connected UEs about how to operate in each of the following slots (e.g. until the end of the current COT). Such indication of slot format information (SFI) performed once in the beginning of the COT may facilitate energy-efficiency of the UEs and the network capacity. By default, gNB may not know if the current or upcoming LBT will succeed or fail. Therefore, the beginning of the COT may be the earliest time, when the SFI can be effectively indicated.

Generally, SFI may be indicated so that symbols in slots during the COT can be configured as Downlink (D), Uplink (U), or Flexible (F). There may be different approaches to indicate a slot format over the COT, for example:

semi-static common configuration—UE is provided with the cell-specific Time Division Duplex (tdd)-UL-DL-ConfigurationCommon to set the periodical slot format over several slots. If UE is not provided this parameter, UE may assume that all symbols are semi-statically flexible.

semi-static dedicated configuration—UE is provided with the tdd-UL-DL-ConfigurationDedicated, which overrides flexible symbols per slot over the number of slots as provided by tdd-UL-DLConfigurationCommon.

dynamic indication—UE is provided with the slot format by Downlink Control Information (DCI) format 2_0 indicating slot formats for slots over Group-Common Physical Downlink Control Channel (GC-PDCCH).

For operation on unlicensed band(s) which are TDD bands, dynamic SFI may be a prominent solution. Dynamic slot format indication may comprise, for example, the following steps:

Step 1: UEs are pre-configured via RRC signaling with the parameter slotFormatCombinations, where the maximum number of possible combinations is set as maxNrofSlotFormatCombinationsPerSet equal to 512. With the parameter slotFormatCombinationId UEs get the set of slot structures. The maximum number of slot formats per one combination is set with RRC parameter maxNrofSlotFormatsPerCombination and is in the range of (0 . . . 255).

Step 2: when the actual slot indication is to be performed (e.g. after a successful LBT), UE may be provided via Physical Downlink Control Channel (PDCCH) by DCI format 2_0 with slot format indicator indicating a slotFormatCombinationId pointing to the particular slot format combination that has been preconfigured by the gNB as discussed above. Such indication may be applicable to one or more cells, which may be also different than the cell carrying the DCI format 2_0. The slot format combination may indicate slot format for set of slots. Thus, slot format combination may indicate slot format for slots during the COT.

SFI may be indicated to UEs e.g. via DCI format 2_0. UE may receive GC-PDCCH, i.e. DCI format 2_0 in a PDCCH CORESET with the UE-specific Transmission Configuration Indicator (TCI) state activated for the CORESET (i.e. the DCI format 2_0 is associated with the TCI state, and hence also the beam, that the corresponding PDCCH CORESET uses).

Figure 2:
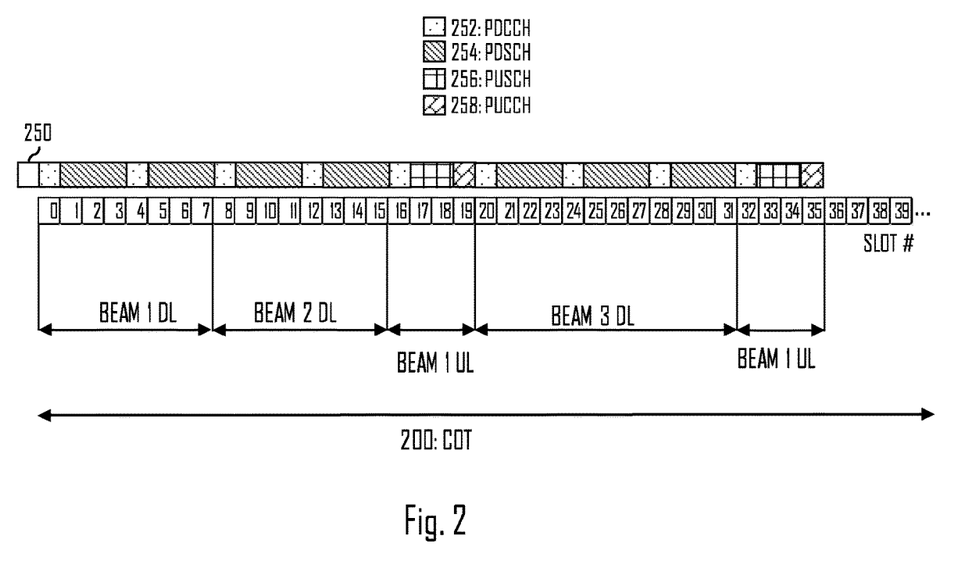
FIG. 2 illustrates an example of a multibeam operation to which embodiments may be applied.

FIG. 2 illustrates an example of multibeam operation to which embodiments may be applied. Referring to FIG. 2, LBT 250 (e.g. quasi-omnidirectional) may precede COT 200, wherein gNB (note that gNB is used as an example, may be some other network node or element as well) may perform beam cycling or switching. Alternatively, the beam directions to be served during the COT could be sensed during the LBT procedure. In the example of FIG. 2, it is assumed that scheduling unit may comprise multiple slots of high Subcarrier Spacing (SCS), such as 480 or 960 kilohertz (kHz) possibly introduced in NR. This may mean that COT of up to 5 ms may comprise 160 or 320 slots for 480 kHz or 960 kHz, respectively. The system may utilize Time Division Multiplexing (TDM) for multiple beams. It is further noted that in the beamforming example of FIG. 2, the number of parallel beams supported may depend on the gNB capability and may be smaller than the total number of beams served by gNB. In the example, PDCCH, which carries the DCI format 2_0 indicating COT structure, may be transmitted per each gNB beam (i.e. on Tx beam) that is served within the COT 200. The signaled COT structure may be specific for the gNB beam and may vary across the beams.

LBT, e.g. the LBT 250, may be quasi-omnidirectional or directional, for example. Directional LBT may refer to beam specific LBT in which network element (e.g. gNB) may perform LBT sequentially for each intended beam at the beginning of COT. Alternatively, for example, the directional LBT may be interleaved in time to happen at the beginning of each intended transmission for the corresponding beam.

As shown in FIG. 2, after LBT, a gNB may plan to serve beam 1 downlink (DL) in slots #0-7, beam 2 DL in slots #8-15, beam 1 uplink (UL) in slots #16-19 and #32-35, and beam 3 DL in slots #20-31. PDCCH 252, Physical Downlink Shared Channel (PDSCH) 254, Physical Uplink Shared Channel (PUSCH) 256, and Physical Uplink Control Channel (PUCCH) 258 are shown with different markings in FIG. 2 (i.e. different pattern fill). For example, slots #0 and #4 may be configured for PDCCH, and slots #1-3 and #5-7 for PDSCH and/or PUSCH grants. For each beam, there may be one or more UEs that are associated with said beam. For example, first group of UEs may be associated with beam 1 and second group of UEs with beam 2, and so on. For example, UEs within one group can be active with the same transmission configuration indication (TCI) state.

COT may be a property of the transmitting node. Channel occupancy detection may be initiated by a node acquiring channel access with LBT procedure. The LBT procedure may comprise a random number of channel sensing or clear channel assessments at the initiating node. The LBT procedure may comprise transmitting a request to receiving or responding nodes for performing channel sensing and reporting the channel sensing outcome to the initiating node. The problem considered here is how to inform UEs in different beams about the ongoing gNB COT and its structure (e.g. which part of COT is active for UE's or UE group's beam). Currently, UEs may need to, for example, listen to PDCCH at least during each PDCCH period even though their beams would not initially be active. This is because gNB may indicate changes to the initially indicated schema. Further, currently there seems to be no mechanism for indicating beam specific SFI. Providing solutions targeting to these problems may enhance power saving, reduce DL control overhead while facilitating configured UL transmissions (Scheduling Request (SR), CG-PUSCH) and/or enable maintaining scheduling flexibility over a COT that may be rather long, e.g. number of slots 160 or 320.

Figure 3:
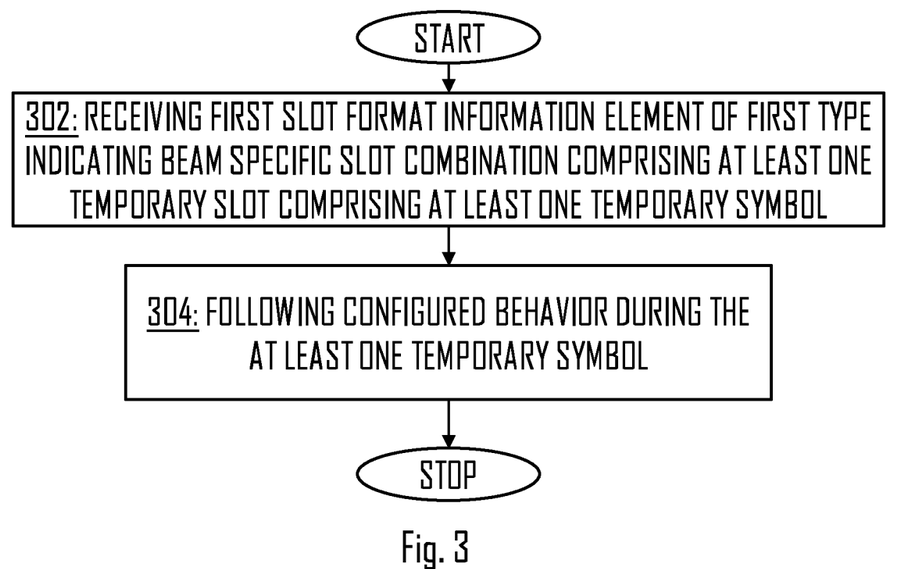
FIGS. 3 and 4 illustrate flow diagrams according to some embodiments.

FIG. 3 illustrates a flow diagram according to an embodiment. Referring to FIG. 3, a method for a UE of a wireless communication network is provided, the method comprising: receiving, from a network element of the wireless communication network, a first slot format information, SFI, element of a first type indicating a beam specific slot combination for the UE, the slot combination comprising at least one temporary slot comprising at least one temporary symbol configured to be overwritable by a SFI element of a second type or another SFI element of the first type (block 302); and following a configured behavior during the at least one temporary symbol (block 304).

Figure 4:
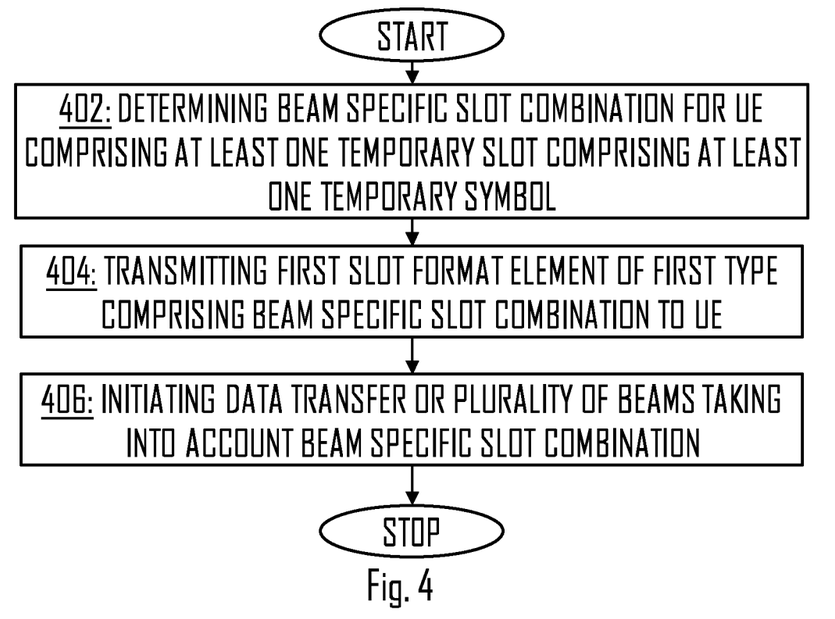

FIG. 4 illustrates a flow diagram according to an embodiment. Referring to FIG. 4, a method for a network element of a wireless communication network is provided, the method comprising: determining a beam specific slot combination for at least one user equipment, UE, the beam specific slot combination comprising at least one temporary slot comprising at least one temporary symbol configured to be overwritable by an SFI element of a second type or an SFI element of the first type (block 402); transmitting, to the at least one UE, a first SFI element of the first type indicating the beam specific slot combination (block 404); and initiating data transfer on a plurality of beams taking into account the beam specific slot combination (block 406).

The described methods of FIGS. 3 and 4 may be applicable in the system (e.g. wireless communication network) of FIG. 1 and in the scenario shown in FIG. 2, for example. The UE discussed with respect to FIGS. 3 and 4 may be, for example, UE 100, or UE 102, or some other similar network device(s). The network element discussed with respect to FIGS. 3 and 4 may refer to network node 104, or to CN 110/CU 108, for example, or to some other network element configured to carry out the described method steps. For example, the network element may refer to one or more network entities (e.g. physically separate network entities). In an example embodiment, the network element is a gNB. The wireless communication network discussed herein may, for example, refer to multibeam capable system, i.e. a network that may be capable of providing services to a plurality of UEs utilizing a plurality of beams (sometimes referred to as radio beams).The network element may provide beam specific slot combination to a plurality of UEs associated with plurality of beams. Hence, different beam specific combinations may be indicated to different UEs as is described later in more detail. It is noted at this point that multibeam capable system may refer to at least one of the following functionalities: network element (e.g. gNB) capable of transmitting and/or receiving via multiple beams simultaneously, and network element (e.g. gNB capable of switching from one beam to another during a COT. Hence, for example, the system described herein may support the former and/or the latter functionality. In the examples shown herein, the latter functionality may be utilized.

According to an embodiment, the described wireless communication network supports communication on unlicensed bands. Therefore, the communication described herein may refer, at least partially, to communication on one or more unlicensed band(s). In an embodiment, the described methods are for mmWave operation.

Figure 5:
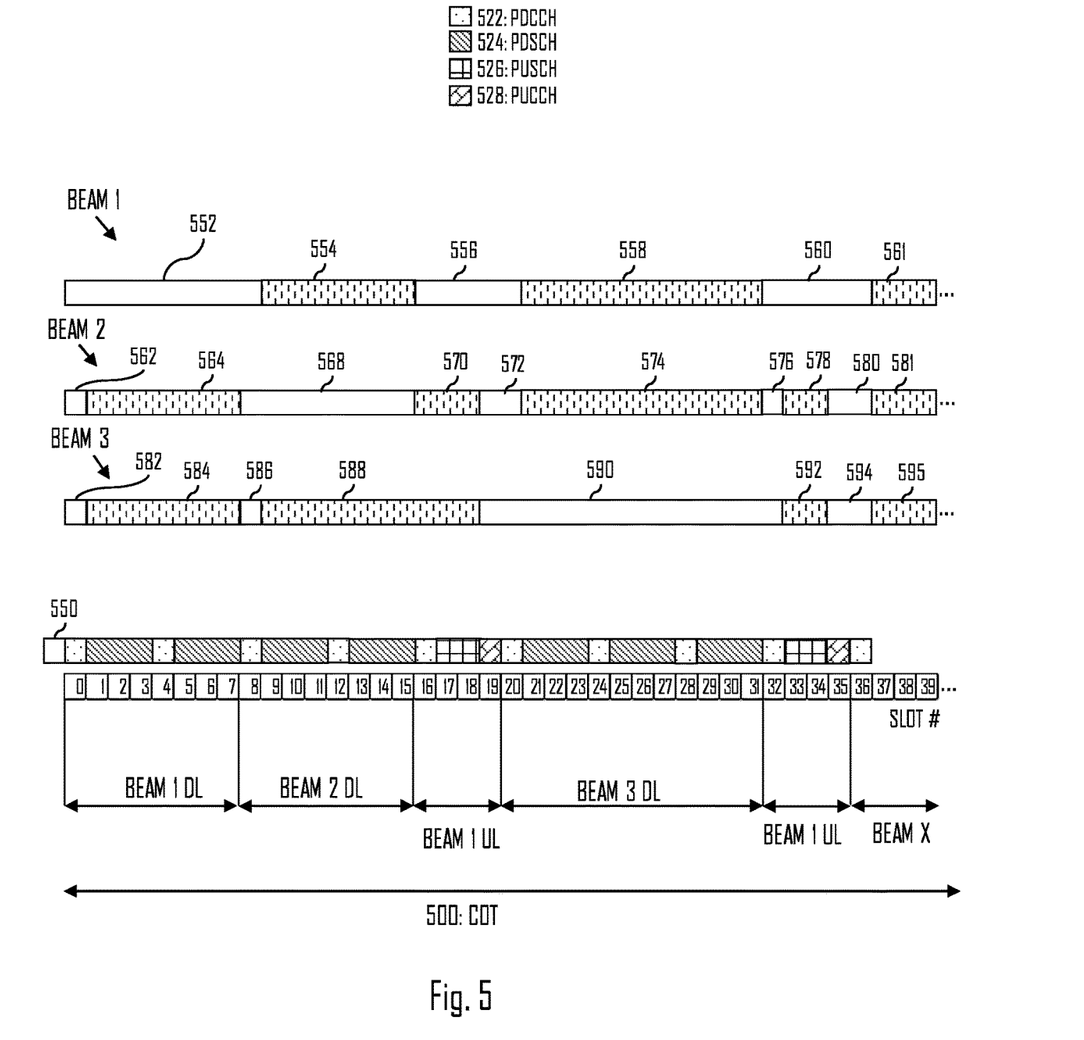
FIG. 5 illustrates beam specific slot combination according to some embodiments.

FIG. 5 illustrates some example embodiments. Referring to FIG. 5, similarly as in FIG. 2, the network element (e.g. gNB) may preconfigure the first SFI elements for different beams and indicate this to the UEs. In this particular example, beam 1 DL may be configured for slots #0-7, beam 2 DL may be configured for slots #8-15, beam 1 uplink (UL) may be configured for slots #16-19 and #32-35, and beam 3 DL may be configured for slots #20-31. PDCCH 522, PDSCH 524, PUSCH 526, and PUCCH 528 are shown with different markings in FIG. 5 (i.e. with different pattern fill). For example, slots #0 and #4 may be configured for PDCCH, and slots #1-3 and #5-7 for PDSCH.

Compared with the scenario shown in FIG. 2, the proposed solution may provide some benefits. For example, after LBT 550, in slot #0 the network element may indicate to UEs associated with beams 1, 2, and 3 beam specific slot combination. For example, slot combination for beam 1 during slots #0-39 may be shown with reference numbers 552-561, slot combination for beam 2 during slots #0-39 may be shown with reference numbers 562-581, and slot combination for beam 3 during slots #0-39 may be shown with reference numbers 582-595. Skilled person understands that the slot combinations may different from each other. As noted earlier, the COT 500 may be longer than the indicated #0-39 (e.g. 160 or 320 slots), but for the sake of simplicity only slots #0-39 are illustrated.

Providing the beam specific slot combination to UEs associated with different beams 1-3, may provide the benefit that the UEs may determine when their associated beam is active. For example, for UEs associated with beam 2 may determine, based on the beam specific slot combination, that beam 2 is active from slot #8 to slot #15. To give another example, the beam specific slot combination may enable said UE to determine that beam 2 may be inactive from slot #1 to slot #7. So, the beam specific slot combination may indicate both beam activeness and inactiveness to the UEs in an efficient manner in terms of control overhead.

To be clear, the network element may indicate a slot combination for one or more UEs associated with beam 1, a slot combination for one or more UEs associated with beam 2, and a slot combination for one or more UEs associated with beam 3, wherein each slot combination may be beam specific (e.g. unique within the COT or at least different from each other). For example, the first SFI element may configure the beam specific slot combination for the duration of COT 500 or remaining duration of COT 500. I.e. if the first SFI element would be transmitted after beginning (or during the COT 500) of the COT 500, the slot combination may be indicated for the remaining duration of the COT 500.

According to an example embodiment, with reference to FIG. 5, the first SFI element (e.g. described with respect to FIGS. 3 and 4) is received, by the UE, from the network element. For example, the first SFI element may be transmitted in a beginning portion of the COT 500, e.g. in a beginning of the COT 500. For instance, this may mean that the first SFI element is transmitted, by the network element, during slot #0, e.g. after and/or in response to successful LBT. So, the UE receiving the first SFI element may obtain the slot combination and thus determine at least one temporary slot and/or symbol and its location in COT 500. For example, the network element may be configured to transmit beam specific SFI element indicating beam specific slot combination for UE(s) of each of the beams (e.g. beam 1, 2, and 3). So, for example, for UEs associated with beam 1 the beam specific slot combination of beam 1 may be indicated by the beam specific SFI element (e.g. first SFI element). In another example, one SFI element comprises a plurality of beam specific slot combinations. Thus, said same one SFI element may be transmitted to a plurality of UEs associated with a plurality of beams. In some examples, COT may be beam-specific and for some beams the temporary slots may continue beyond point where network element's COT ends.

The first SFI element may be indicated to the UE using an indicator (sometimes referred to as first indicator). For example, the indicator may be preconfigured via Radio Resource Control (RRC) signaling. Further, DCI 2_0 may be used for the indication (e.g. on control channel, such as GC-PDCCH) of the first SFI element Orthogonal Frequency Division Multiplex (OFDM) symbols.

As shown in FIG. 5, for each beam, a plurality of non-temporary slots or symbol may be configured. Therefore, the beam specific slot combination indicated by the first SFI element may comprise at least one non-temporary slot or symbol. For beam 1, non-temporary slots are indicated for periods with reference numbers 552, 556, and 560. For beam 2, non-temporary slots are indicated for periods with reference numbers 562, 568, 572, 576, and 580. For beam 3, non-temporary slots are indicated for periods with reference numbers 582, 586, 590, and 594. These periods correspond to certain slots, wherein each slot may be configured according to the illustrated coding (see e.g. FIG. 5). So, for example, slot #0 is for PDCCH, and therefore said slot may be e.g. downlink slot for all beams 1, 2, and 3. This may be indicated in the first SFI element. Similarly, slot #19 may be uplink slot for all beams 1, 2, and 3 as it is configured for PUCCH. To give a further example, slot #18 may be temporary for beams 2 and 3, whereas for beam 1 it may be uplink slot as slot #18 is configured for PUSCH. Other combinations and examples are apparent from FIG. 5.

The proposed temporary slot(s) or symbol(s) may allow network to fix slot and/or symbol format (e.g. DL, UL and or flexible) for a subset of slots in the upcoming COT 500 at the beginning of the COT (e.g. slot #0). This may allow the network to prune the locations for DL and UL control signals and leave some symbols/slots within COT as temporary, i.e. allowing the possibility to override those in the future if necessary. This may also facilitate power saving as a longer SFI may be indicated without compromising scheduling flexibility later on.

According to an embodiment, at least one temporary symbol is indicated as at least one flexible symbol in the first SFI element. The UE receiving the first SFI element may determine, based on that the first SFI element is of first type, that the indicated at least one flexible symbol is the at least one temporary symbol. This is one way of indicating the temporary slots and/or symbols to the UEs. So, in this embodiment, if symbol is marked as flexible by the network element, it may be determined, by the UE, to be a temporary symbol if the first SFI element is of first type.

According to an embodiment, the at least one temporary slot is indicated with a specific value. That is, the at least one temporary slot may be indicated with a specific slot format value. The UE may determine, based on the specific value of slot format, the at least one temporary slot. For example, some index number may be selected to indicate temporary slot (e.g. index #254). If only one index number is selected to indicate a temporary slot, all symbols in the indicated temporary slot may be deemed temporary. Currently, for example, there may be 56 slot formats defined, each containing different combinations of DL/UL/flexible symbols. This may leave 199 from 256 slot format indexes free. One of these values (e.g. 254) may thus be reserved for indicating temporary slot comprising only temporary symbols. Another index value between the range 199 to 256 may potentially be used instead of index 254 or in addition to index 254. So, using the defined specific value may enable the temporary slot(s) to be indicated in the SFI element. In such case, all symbols in the indicated temporary slot may be temporary.

According to an embodiment, the network element indicates, via radio resource control (RRC) signaling or an indication comprised in a downlink control message carrying the first SFI element, that the first SFI element is of the first type. Such indicating is performed if the first SFI element is of the first type. The UE may thus determine, based on the radio resource control, RRC, signaling or the indication comprised in the downlink control message carrying the first SFI element, that the first SFI element is of the first type. In other words, the network element may indicate, via RRC signaling or an indication comprised in a downlink control message carrying SFI element, whether the SFI element is of first type or second type. Thus, the UE may determine whether the received SFI element is of the first type or the second type. Such may be beneficial, for example, if temporary slot(s) or symbol(s) are indicated as flexible slot(s) or symbol(s) in the SFI element of first type. Thus, based on the information that the SFI element is of first type, the UE may determine that slots or symbols indicated as flexible may be temporary slots or symbols.

Figure 6:
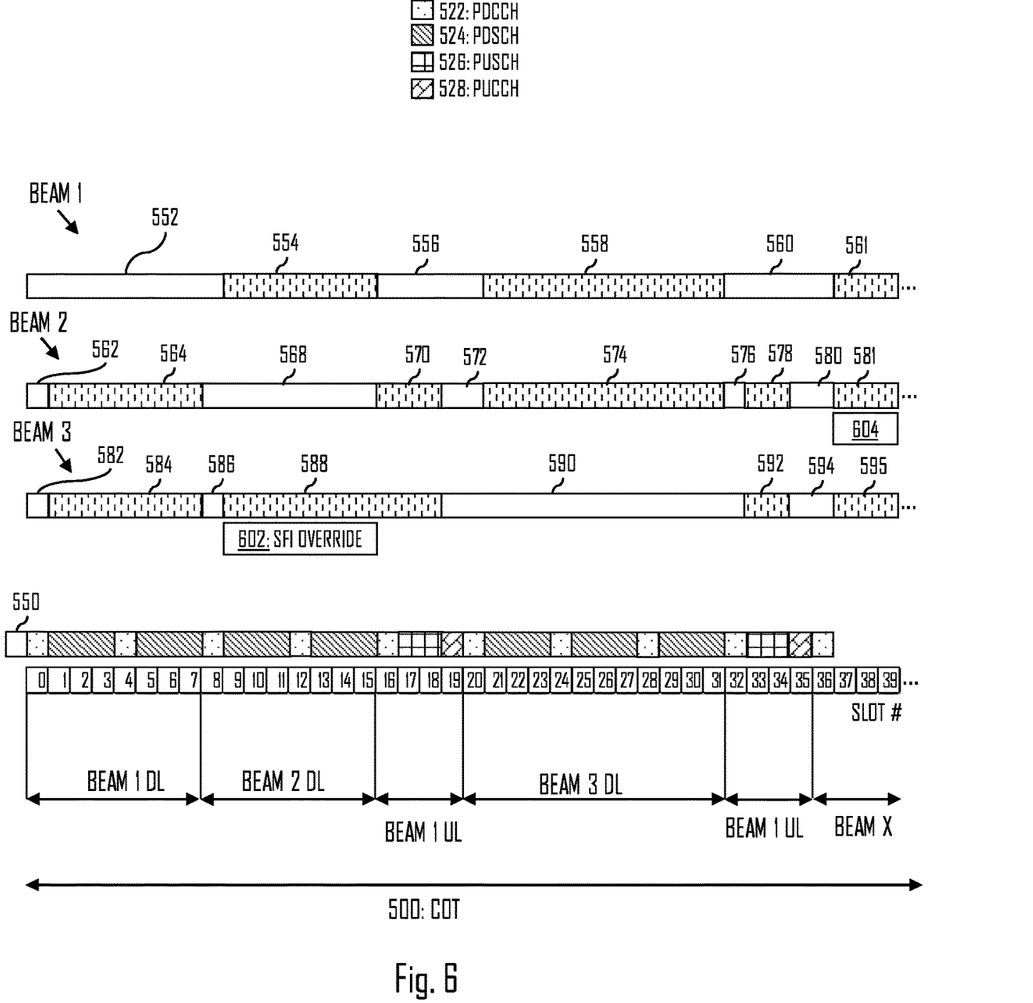
FIG. 6 illustrates some example embodiments of overwriting initially provided beam specific slot combination.

FIG. 6 illustrates some further embodiments. As shown in FIGS. 5 and 6, beam X is depicted for slots #36 to #39. Further, slots #37 to #39 are initially configured as temporary for all beams 1, 2, and 3. Slot #36 is configured for PDCCH, and thus UEs of all beams 1, 2, and 3 may be able to receive SFI during slot #36 even if they follow first behavior. The network element may, for example, initially configure slots #37 to #39 to be used for possible retransmission(s) which may not be known in the beginning of COT 500.

So, for example, in slot #36 the network element may configure slots #37 to #39 for beam 2. It is also possible to perform configuration earlier. This may mean that, as indicated with block 604, temporary slots (i.e. #37 to #39) are overwritten with non-temporary slots for UEs of beam 2. Thus, UEs of beam 2 may transfer data in said slots according to the configuration (e.g. DL, UL, or flexible slots). For example, initially slots #37 to #39 may be reserved for retransmission(s), and in this example used for beam 2 (e.g. for retransmission).

Similar overwriting is shown with block 602 that may depict overwriting temporary slots #9 to #16 with non-temporary slots for UEs of beam 3. In this case, beam 2 DL may be changed to beam 3 (e.g. DL or UL).

Being able to overwrite the temporary slots or symbols may enable the solution to be even further flexible as if, for example, urgent data arrives to some UE or UEs, it may be promptly transferred to/from said UE(s) by utilizing the possibility of overwriting one or more temporary slots or symbols. As implied by the word overwriting, the temporary slot(s) or symbol(s) may already be configured via the first SFI element, and another SFI element received after the first SFI element may be utilized for the overwriting. So, for example, after reception of the first SFI element, the UE may receive a second SFI element overwriting one or more temporary slots or symbols (e.g. slots #37 to #39 of beam 2) with one or more non-temporary slots or symbols. The second SFI element may also be transmitted by the network element transmitting the first SFI element. Thus, the same network element may change its initial configuration, for example. It is noted that in some cases it may be possible to overwrite a temporary symbol or symbols within a temporary slot with a non-temporary symbol or symbols. In such case, if the slot still comprises temporary symbol(s) after the rewriting operation, the slot may still be a temporary slot. So, the solution may enable also rewriting one or more temporary symbols in one or more temporary slots.

In an embodiment, the second SFI element is of a second type. According to an embodiment, SFI element of second type does not indicate any temporary slots. Hence, the second type may indicate non-temporary slot(s) (e.g. overwrite one or more temporary slots with one or more non-temporary slots). Thus, for example, if first type may indicate temporary slots or symbols as flexible slots or symbols, the second type may indicate flexible slots or symbols as flexible slots or symbols.

In an embodiment, the second SFI element is of the first type. For example, initial configuration by the first SFI element may be totally or partially overwritten. Using the first type in the indication may enable, for example, the slot combination of the whole COT 500 to be changed.

Let us then discuss in more detail what kind of different indications and rules utilizing the two type of SFI elements may enable.

In an embodiment, the UE is configured to determine a set of conflict resolution rules regarding the first and second type SFI elements, and to determine a slot combination based on the set of conflict resolution rules and received first and second SFI elements. Moreover, the UE may follow the determined slot combination. That is, the set of conflict resolution rules may comprise one or more of the discussed examples and embodiments herein. For example, the set of rules may be configured to the UE by the wireless communication network (e.g. by the network element such as gNB).

According to an example embodiment, beam specific slot combination of SFI element of a second type overrides the beam specific slot combination of SFI element a first type for the duration of the slot combination of the second type. For example, the slot combination indicated in the SFI element of second type may be shorter than the slot combination indicated in the SFI element of first type. The set of conflict resolution rules may comprise the rules discussed in this example embodiment, for example.

Even more advanced conflict resolution rules may be utilized. According to an example embodiment, the UE(s) are configured to determine the slot combination as follows: the slot combination indicated in an SFI element of the first type is followed if slot or symbol is marked as uplink or downlink in the SFI element of the first type. Further, slot combination indicated in an SFI element of the second type is followed if slot or symbol is marked as flexible in the SFI element of the first type. So, basically UE may follow the slot combination indicated in the SFI element of the first type if slot or symbol is marked as uplink or downlink. However, if slot or symbol is marked as flexible (e.g.

temporary) in the SFI element of the first type, the SFI element of the second type may be used to override those slots or symbols (e.g. uplink, downlink or flexible). The set of conflict resolution rules may comprise the rules discussed in this example embodiment, for example.

According to an example embodiment, the UE(s) are configured to determine the slot combination to follow as follows: the slot combination indicated in an SFI element of the second type is followed if slot or symbol is marked as uplink or downlink in the SFI element of the second type. Further, slot combination indicated in an SFI element of the first type is followed if slot or symbol is marked as flexible in the SFI element of the second type. So, for example, if first type SFI element configures slot or symbol as flexible and second type SFI element as DL, conflict resolution may be DL, i.e. second type SFI element may be followed. In another example, if first type SFI element configures slot or symbol as DL and second type SFI as flexible, conflict resolution may be DL, i.e. first type SFI may followed. The set of conflict resolution rules may comprise the rules discussed in this example embodiment, for example.

Based on one or more slot combinations indicated in these one or more SFI elements (first type or first type and second type), the UE may determine slot combination it will apply, i.e. slot combination that it will follow (e.g. based on the set of conflict resolution rules). To give an example, the UE may first follow slot combination indicated in the first SFI element of first type, and later if further SFI elements are received (e.g. of second type), the UE may determine the slot combination to follow based on the received SFI elements (i.e. first and second SFI elements) and configured rules discussed in the various embodiments herein. So, the initially configured slot combination may be updated within the COT 500.

There may be a plurality of options of how to transfer the second SFI element to the UE(s) by the network element. In an embodiment, the second SFI element is transmitted on control channel, e.g. GC-PDCCH. The indication may be such that the indicated SFI covers only a portion of the SFI indicated by the first SFI element. Thus, for example, the same GC-PDCCH may be used to trigger both the first and second SFI elements (sometimes referred to as simply first and second indicators), wherein the first SFI element covers a longer period than the second SFI element. For example, the second SFI element may cover a period within the period indicated by the first SFI element (e.g. the beginning of the period indicated by the first SFI). For example, the second SFI element may indicate slot combination for one or more slots of the COT 500 from the beginning of the COT 500.

In an embodiment, the second SFI element is transmitted on GC-PDCCH using a different Radio Network Temporary Identifier (RNTI). So, UE may receive the first and second SFI elements in different control messages.

In an embodiment, the second SFI element may be transmitted on a dedicated DCI (e.g. UL or DL resource allocation).

Referring to an example shown in FIG. 5, first type (e.g. TYPE-1) slot combinations (sometimes referred to simply as SFI combinations) may be indicated according to an anticipated beam cycle operation (e.g. beam 1, beam 2, beam 3, and if there are more beams, other beams may follow) at the beginning of COT 500 (e.g. slot #0). For example, SFI element of the first type may be used for the indication in which the temporary slot(s) or symbols may be indicated as flexible slots, or temporary slots may be indicated with a specific or special value (e.g. 254). Hence, the UEs of each beam (e.g. b1, b2, b3) may be informed about the time periods they may transmit/receive something already at the beginning of the COT 500. UEs may act accordingly. Thus, for example, power may be saved during the temporary slot(s) and/or symbol(s). For example, the network element may reserve one or more cycles (e.g. slots #37-39) for potential re-transmissions.

If COT 500 is shortened, e.g. by the network element, the UE may disregard slot combination(s) extending outside the shortened COT 500.

In an example, network element may configure the beams so that for certain one or more slots or symbols (e.g. slots #19 and #35) in the COT 500, the beams are active for uplink operation. For example, this may enable UEs to transmits scheduling requests if necessary, thus further enhancing the flexibility of the solution. This may be indicated to the UEs via the first SFI element and/or via the second SFI element, for example.

In an embodiment, second type (e.g. TYPE-2) SFI element comprises parameter indicative of COT 500 duration (such as CO-DurationList-r16). This parameter can be used to shorten the COT from the end (e.g. for the cases where re-transmissions are deemed not needed).

In an embodiment, one or more slot combinations indicated in one or more SFI elements of the first type and/or the second type are indicated as repeated patterns. For example, a certain slot or symbol pattern may be indicated together with information on how many times the pattern should be repeated. The UE may follow the indicated pattern according to the indicated number of repetitions. In an embodiment, the UE is configured (e.g. by the network element) to follow a certain behavior in each repetition. For example, first behavior may be followed during first repetition of the pattern and second behavior may be followed during second repetition.

The provided solution may enable facilitating beam cycling or serving multiple beams within COT 500 of the network element. Moreover, power saving for UE(s) with active TCI state of one beam (e.g. beam 1) while network element serves UE(s) with activated TCI state of another beam (e.g. beam 2). UE power saving and DL overhead reduction may be achieved while maintaining scheduling flexibility because it may be possible to adjust the SFI information (or slot combination in other words) during a long COT (e.g. by transmitting the second SFI element). Further, number of PDCCH needed to transmit during COT may be reduced.

Another benefit may be that RRC configuration of slot format combinations may be simplified since network element may have a relatively small set of first type SFI combinations and a set of second type of SFI combinations within a cycle. Cycle herein may refer to the period indicated by the first SFI element, for example.

Figure 7:
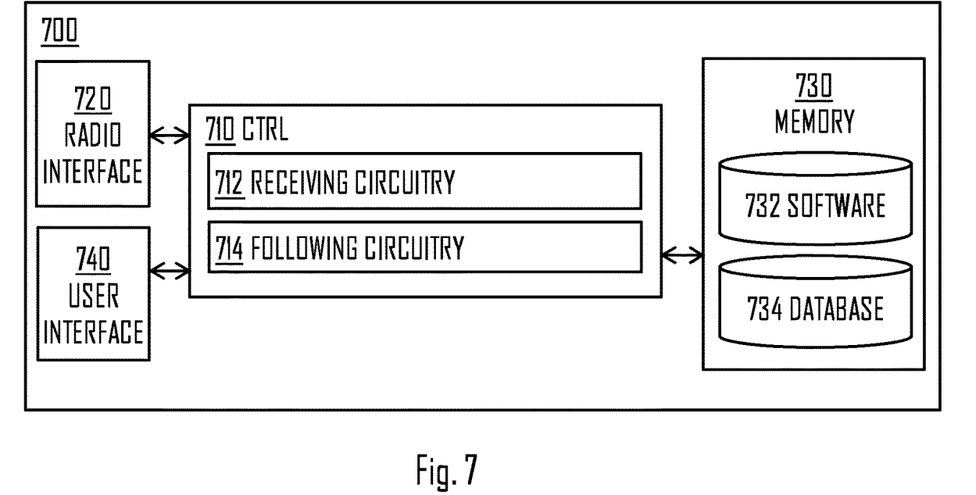
FIGS. 7 and 8 illustrate block diagrams of apparatuses according to some embodiments.
Figure 8:
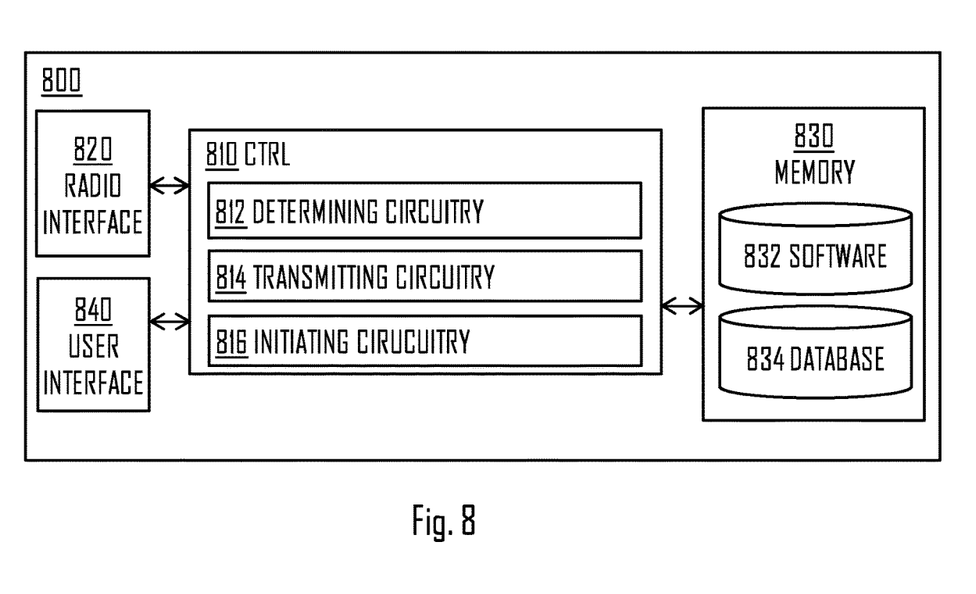

FIGS. 7 and 8 provide apparatuses 700, 800 comprising a control circuitry (CTRL) 710, 810, such as at least one processor, and at least one memory 730, 830 including a computer program code (software) 732, 832, wherein the at least one memory and the computer program code (software) 732, 832, are configured, with the at least one processor, to cause the respective apparatus 700, 800 to carry out any one of the embodiments of FIGS. 1 to 6, or operations thereof.

Referring to FIGS. 7 and 8, the memory 730, 830, may be implemented using any suitable data storage technology, such as semiconductor based memory devices, flash memory, magnetic memory devices and systems, optical memory devices and systems, fixed memory and removable memory. The memory 730, 830 may comprise a database

734, 834 for storing data. For example, slot combination of the COT may be stored in the database. For example, the stored slot combination may be updated based on second SFI element received from the network element.

The apparatus 700, 800 may further comprise radio interface (TRX) 720, 820 comprising hardware and/or software for realizing communication connectivity according to one or more communication protocols. The TRX may provide the apparatus with communication capabilities to access the radio access network, for example. The TRX may comprise standard well-known components such as an amplifier, filter, frequency-converter, (de)modulator, and encoder/decoder circuitries and one or more antennas.

The apparatus 700, 800 may comprise user interface 740, 840 comprising, for example, at least one keypad, a microphone, a touch display, a display, a speaker, etc. The user interface 740, 840 may be used to control the respective apparatus by a user of the apparatus 700, 800.

In an embodiment, the apparatus 700 may be or be comprised in the UE performing the method described above e.g. with respect to FIG. 3. For example, the apparatus 700 may be or be comprised in the UE 100 or UE 102.

In an embodiment, the apparatus 800 may be or be comprised in the network element performing the method described above e.g. with respect to FIG. 4. For example, the apparatus 800 may be or be comprised in the network node 104, or similar network node.

According to an embodiment, with reference to FIG. 7, the control circuitry 710 comprises a receiving circuitry 712 configured at least to perform operations described with respect to block 302 of FIG. 3; and a following circuitry 714 configured at least to perform operations described with respect to block 304 of FIG. 3.

According to an embodiment, with reference to FIG. 8, the control circuitry 810 comprises a determining circuitry 812 configured at least to perform operations described with respect to block 402 of FIG. 4; a transmitting circuitry 814 configured at least to perform operations described with respect to block 404 of FIG. 4; and a initiating circuitry 816 configured at least to perform operations described with respect to block 406 of FIG. 4.

In an embodiment, at least some of the functionalities of the apparatus 800 may be shared between two physically separate devices, forming one operational entity. Therefore, the apparatus 800 may be seen to depict the operational entity comprising one or more physically separate devices for executing at least some of the described processes. Thus, the apparatus 800 utilizing such shared architecture, may comprise a remote control unit (RCU), such as a host computer or a server computer, operatively coupled (e.g. via a wireless or wired network) to a remote radio head(s) (RRH) located in a base station or network node 104, for example. In an embodiment, at least some of the described processes may be performed by the RCU. In an embodiment, the execution of at least some of the described processes may be shared among the RRH and the RCU. For example, CU/DU split may utilize such shared architecture.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

According to an aspect there is provided a system comprising a plurality of apparatuses 700 and one or more apparatuses 800. For example, the apparatuses 700 may be associated with a certain beam of a plurality of beams provided by the apparatus 800. Beam specific slot combination may be indicated to the apparatuses 700 by the apparatus 800 e.g. by transmitting the first SFI element or elements. The slot combination may be changed e.g. by transmitting one or more second SFI elements. The second SFI element(s) may overwrite one or more temporary slots of the beam specific slot combination(s).

As used in this application, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that utilize software or firmware for operation, even if the software or firmware is not physically present. This definition of 'circuitry' applies to uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 1 to 6 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 1 to 6 or operations thereof.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments of FIGS. 1 to 6, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 1 to 6 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to an example according to the accompanying drawings, it is clear that the invention is not restricted thereto but can be modified in several ways within the scope of the appended claims. Therefore, words and expressions herein should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method for a user equipment, UE, of a wireless communication network, the method comprising:

receiving, from a network element of the wireless communication network, a first slot format information, SFI, element of a first type indicating a beam specific slot combination for the UE, the slot combination comprising at least one temporary slot comprising at least one temporary symbol configured to be overwritable by a SFI element of a second type or another SFI element of the first type; and following a configured behavior during the at least one temporary symbol wherein the first SFI element configures the beam specific slot combination for the duration of COT or remaining duration of COT, and wherein the first SFI element is received from the network element in a beginning of a channel occupancy time, COT, the method further comprising:

after reception of the first SFI element, receiving a second SFI element overwriting one or more temporary symbols of said at least one temporary symbol with one or more non-temporary symbols, wherein the configured behavior comprises at least a first behavior and a second behavior, wherein following the first behavior causes the UE to prevent transmitting and receiving during the at least one temporary symbol, and wherein following the second behavior causes the UE to monitor control channel or transmit and receive one or more configured signals during the at least one temporary symbol.

2. The method of claim 1, wherein the wherein the first SFI element is received via physical layer signaling on the PDCCH.

3. The method of claim 1, wherein the wherein the beam specific slot combination is configured for simultaneous use of a plurality of beams associated with the UE.

4. The method of claim 1, second SFI element is transmitted by the network element using higher-layer MAC signaling.

5. The method of claim 4, wherein the second SFI element is of the second type, and wherein the second SFI element of the second type does not indicate one or more temporary slots.

6. The method of claim 4, wherein the second SFI element is of the first type, and wherein the second SFI element of the first type indicates at least one temporary slot.

7. The method of claim 1, wherein the at least one temporary symbol is indicated as at least one flexible symbol in the first SFI element, the method further comprising:

determining, based on that the first SFI element is of the first type, that the indicated at least one flexible symbol is the at least one temporary symbol.

8. The method of claim 1, wherein the at least one temporary symbol is indicated with a specific value, the method further comprising:

determining, based on the specific value, the at least one temporary slot.

9. The method of claim 1, wherein the beam specific slot combination further comprises at least one non-temporary slot.

10. The method of claim 1, wherein the configured behavior further comprises muting transmission of reference signals during the at least one temporary symbol.

11. A method for a network element of a wireless communication network, the method comprising:

determining a beam specific slot combination for at least one user equipment, UE, the beam specific slot combination comprising at least one temporary slot comprising at least one temporary symbol configured to be overwritable by a slot format information, SFI, element of a second type or an SFI element of the first type;

transmitting, to the at least one UE, a first SFI element of the first type indicating the beam specific slot combination; and initiating data transfer on a plurality of beams taking into account the beam specific slot combination, wherein the first SFI element configures the beam specific slot combination for the duration of COT or remaining duration of COT, and wherein the first SFI element is transmitted in a beginning of a channel occupancy time, COT the method further comprising:

after transmission of the first SFI element, transmitting, to the at least one UE, a second SFI element overwriting one or more temporary symbols of said at least one temporary symbol with one or more non-temporary symbols, wherein the configured behavior comprises at least a first behavior and a second behavior, wherein following the first behavior causes the UE to prevent transmitting and receiving during the at least one temporary symbol, and wherein following the second behavior causes the UE to monitor control channel or transmit and receive one or more configured signals during the at least one temporary symbol.

12. The method of claim 11, wherein the first SFI element is transmitted via PDCCH signaling.

13. The method of claim 11, wherein the first SFI element is transmitted to a plurality of UEs concurrently with respective beam-specific slot combinations.

14. The method of claim 11, wherein the second SFI element is transmitted as broadcast signaling affecting a plurality of UEs.

15. The method of claim 14, wherein the second SFI element is of the second type, and wherein the second SFI element of the second type does not indicate one or more temporary slots.

16. The method of claim 14, wherein the second SFI element is of the first type, and wherein the second SFI element of the first type indicates at least one temporary slot.

17. The method of claim 11, wherein the at least one temporary symbol is indicated as at least one flexible symbol in the first SFI element.

18. The method of claim 11, wherein the at least one temporary slot is indicated with a specific value.

19. The method of claim 11, wherein the beam specific slot combination further comprises at least one non-temporary slot.

20. The method of claim 11, wherein the configured behavior defines that the UE shall monitor a control channel on a different beam than used for data transmission.

* * * * *